No. 749,161. PATENTED JAN. 12, 1904.
J. M. BROWN.
CARPET STRETCHER.
APPLICATION FILED JAN. 28, 1903.
NO MODEL. 2 SHEETS—SHEET 2.

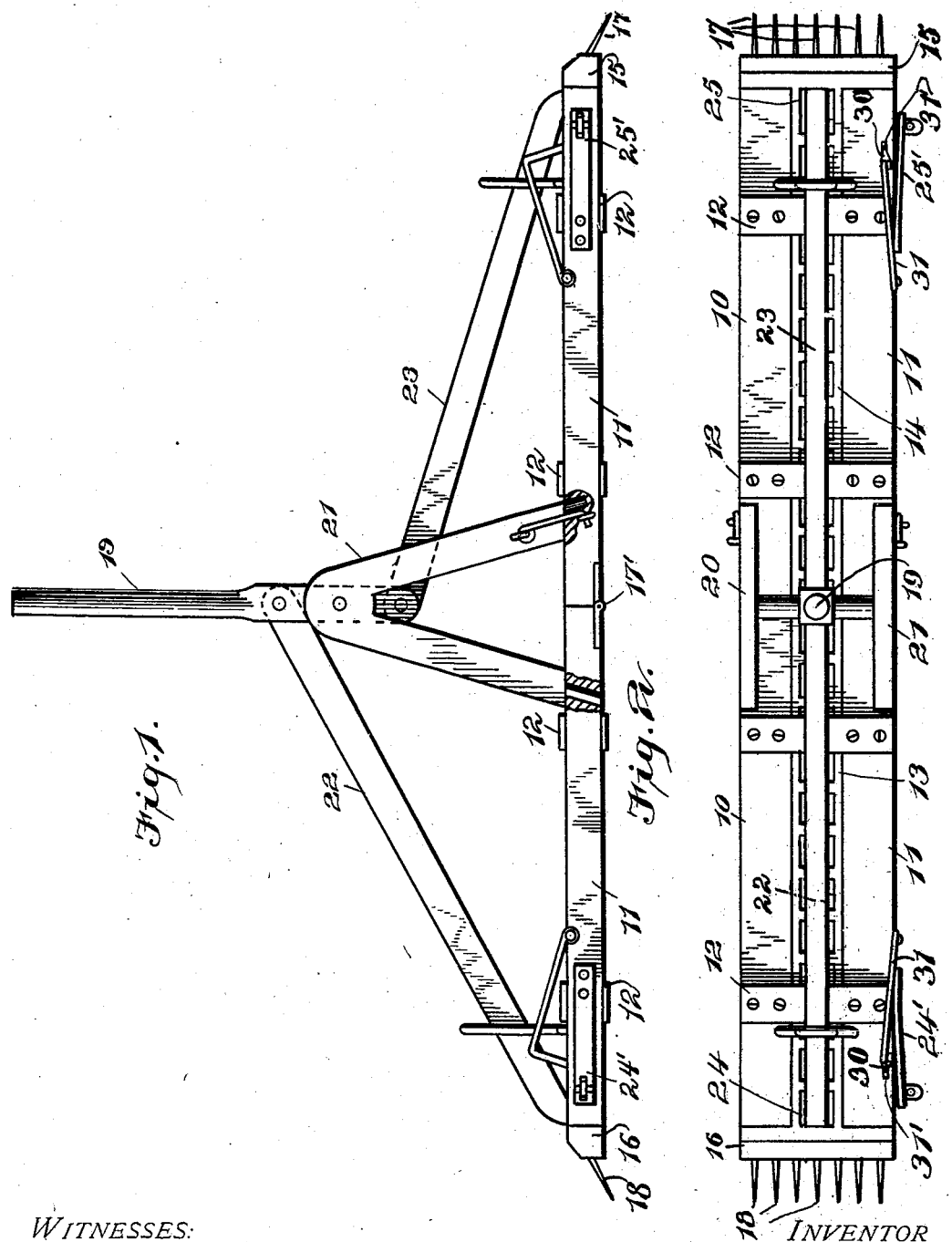

WITNESSES:
T. P. Brett

INVENTOR
J. M. Brown,
By Chandlee & Chandlee
Attorneys

No. 749,161. Patented January 12, 1904.

UNITED STATES PATENT OFFICE.

JAMES M. BROWN, OF ELKFALLS, KANSAS.

CARPET-STRETCHER.

SPECIFICATION forming part of Letters Patent No. 749,161, dated January 12, 1904.

Application filed January 28, 1903. Serial No. 140,862. (No model.)

*To all whom it may concern:*

Be it known that I, JAMES M. BROWN, a citizen of the United States, residing at Elkfalls, in the county of Elk, State of Kansas, have invented certain new and useful Improvements in Carpet-Stretchers; and I do hereby declare the following to be a full, clear, and exact description of the invention, such as will enable others skilled in the art to which it appertains to make and use the same.

This invention relates to carpet-stretchers; and it has for its object to provide a construction wherein by manipulation of a lever the carpet-engaging heads of the stretcher will be shifted to stretch the carpet to the desired degree, a further object of the invention being to provide a construction which will be simple and cheap of manufacture and efficient in its operation.

Figure 3:
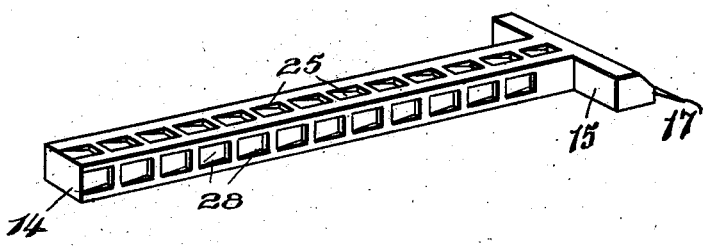
Figure 4:
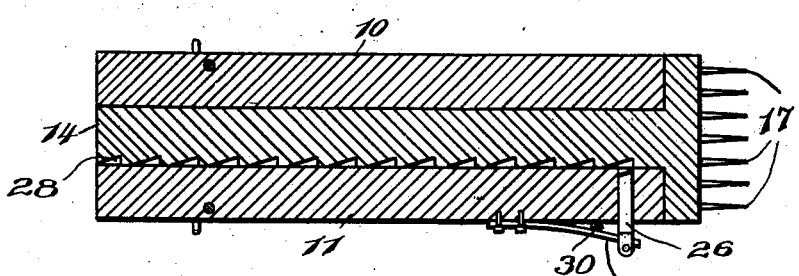
Figure 5:
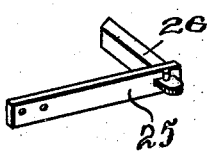

In the drawings forming a portion of this specification, and in which like numerals of reference indicate similar parts in the several views, Figure 1 is a side elevation of a carpet-stretcher embodying the present invention. Fig. 2 is a top plan view of the carpet-stretcher. Fig. 3 is a detail perspective view of one of the shiftable members of the stretcher and its engaging head. Fig. 4 is a horizontal section through one end portion of the stretcher and illustrating the retaining-pawl. Fig. 5 is a perspective view of one of the retaining-pawls.

Referring now to the drawings, the present stretcher comprises a base in the form of a frame including end sections, each comprising spaced longitudinal members 10 and 11, having connecting cross-pieces 12, between which longitudinal members are slidably disposed the stems of the slidable members of stretcher. The stems in question are shown at 13 and 14, and at their outer ends are transverse heads 15 and 16, provided with teeth 17 and 18, respectively. The end sections of the frame are connected by hinges 17'. The stems 13 and 14 are fitted snugly between the longitudinal members 10 and 11, but sufficiently loose to permit of longitudinal movement thereof to cause the heads to travel toward and away from each other.

To shift the movable members of the stretcher, a lever 19 is provided and is pivoted upon a shaft carried by the uprights 20 and 21 on the members 10 and 11, respectively, and pivoted to the lever at points above and below its shaft, respectively, are long pawls 22 and 23, the free ends of which are adapted to engage racks 24 and 25, formed in the upper faces of the stems 13 and 14. Thus by rocking the lever 19 the pawls are reciprocated simultaneously in opposite directions, so that the outer or free ends thereof are engaged with the racks to move the stems 13 and 14 outwardly, and then are drawn backwardly over the racks to engage them at different points, so that when the movement of the lever is again reversed the movable members will be further advanced. To hold the movable members against return movement when released by the operating-pawls, retaining spring-pawls 24' and 25' are provided and are fixed at their inner ends upon the members 11, the outer or free ends of the pawls having laterally-directed fingers 26 for engagement with the rack-teeth 28, formed upon the stems 13 and 14. Thus as the movable members are shifted to carry the heads thereof away from each other the second rack-teeth move freely beneath the fingers of the spring-pawls, and when the operating-pawls release their racks the spring or retaining pawls engage their racks and hold the movable members against return movement.

In practice the teeth of the heads are engaged with the carpet at opposite sides of the latter after the stems have been drawn out to the proper positions, and the lever is then manipulated to further separate the heads and stretch the carpet, after which the latter may be tacked in place.

When the stems 13 and 14 are to be slid inwardly in the frame-sections, the spring-pawls must be held from engagement with the side racks of the stems, and for this purpose wedges 30 are provided having laterally-directed stems 31, which are pivoted to the sides or members 11 of the frame-sections, so that the wedges may enter between the corresponding retaining-pawls and the members 11 to press the retaining-pawls outwardly and hold them in such disengaging positions. In the tops of the members 11 are recesses 31', with which the extremities of the wedges may be engaged when not in use, the pivotal connections of the stems of the wedges being sufficiently loose to permit lateral swinging of the wedges over the members 11.

In practice modifications of the specific construction shown may be made, and any suitable materials and proportions may be used for the various parts without departing from the spirit of the invention.

What is claimed is—

1. In a carpet-stretcher, the combination with spaced longitudinal members, of two oppositely-movable toothed heads having stems slidably engaged between the members, each stem being provided with two series of rack-teeth, a pivoted lever having pawls for engagement with one series of teeth of each stem to shift the stems when the lever is rocked, and spring-pressed retaining-pawls mounted upon the spaced members in operative relation with the other series of rack-teeth of the stems to hold the latter against return movement, and means for holding the retaining-pawls in inoperative position.

2. In a carpet-stretcher, the combination with a frame, comprising longitudinal spaced members, having connecting cross-pieces, of oppositely-movable toothed heads having stems slidably disposed between the sides of the frame, each of said stems having two series of rack-teeth, uprights upon the longitudinal members, a lever having a fulcrum mounted in the said uprights, dogs pivoted to the lever at opposite sides of the fulcrum each in operative relation to the series of rack-teeth of a stem, perforations in the spaced members, pawls disposed within the perforations for engagement with the other series of rack-teeth, springs mounted upon the faces of the spaced members and adapted to bear upon the outer ends of the pawls to hold them in engagement with the rack-teeth, and wedges pivoted to the spaced members and adapted to be inserted between the springs and the spaced members to remove the tension of the springs from the pawls.

In testimony whereof I affix my signature in presence of two witnesses.

JAMES M. BROWN.

Witnesses:
   JAMES K. SPRAGUE,
   PAYTON E. PARKER.